3,251,898
CONVERSION OF ALKYL AROMATIC HYDROCARBONS

Anthony George Goble and John Brown Wilson, Sunbury-on-Thames, England, assignors to The British Petroleum Company Limited of Britannic House, London, England, a British joint-stock corporation
No Drawing. Filed June 20, 1962, Ser. No. 203,708
Claims priority, application Great Britain, June 23, 1961, 22,818/61
8 Claims. (Cl. 260—672)

This invention relates to the conversion of alkyl aromatic hydrocarbons particularly the disproportionating of alkyl aromatic hydrocarbons.

The availability of individual alkyl aromatic or aromatic hydrocarbons and the demand for them has not, in the past, always been in balance. For example, toluene is less in demand than either benzene or xylenes and methyl-naphthalenes than naphthalene and a process which is capable of converting alkyl aromatics to aromatics and/or other alkyl aromatics is, therefore, useful.

The complete specification of cognate Serial No. 135,426, filed September 1, 1961, claims a catalyst which is prepared by contacting alumina with a compound of general formulae:

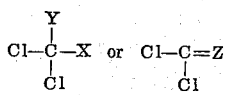

where X and Y may be the same or different and are selected from the group consisting of H, Cl, Br and SCl and where Z is selected from the group consisting of O and S under non-reducing conditions and at a temperature such that chlorine is taken up by the alumina without the production of free aluminum chloride. The use of the catalyst for the isomerisation of $C_4$ or higher paraffin hydrocarbons boiling within the gasoline boiling range i.e. up to 400° F. (204° C.), at temperature below 400° F. (204° C.) is claimed in the complete specification of cognate U.K. patent applications Nos. 29,542/61 and 29,543/61.

It has now been found that the catalyst also has activity for the conversion of alkyl aromatic hydrocarbons. According to the present invention, therefore, alkyl aromatic hydrocarbons are converted to other alkyl cyclic hydrocarbon and/or cyclic hydrocarbons by contact with a catalyst prepared by contacting a halogentable inorganic oxide with a compound of the general formula given above under non-reducing conditions and at a temperature such that chlorine is taken up by the inorganic oxide without the production of free inorganic chloride.

The term "alkyl cyclic hydrocarbons and/or cyclic hydrocarbons" includes both alkyl aromatics and aromatics and also alkyl naphthenes and naphthenes. The production of alkyl aromatics and/or aromatics is, however, preferred and alkyl naphthenes and/or naphtenes will only be produced under certain conditions, indicated later, which favour hydrogenation.

The conversion reaction effected by the catalyst is principally disproportionation, with isomerisation where this is possible and also dealkylation, the extent and relative amounts of these reactions being dependent on the process conditions used, the type of catalyst used and the feedstocks used. In general the process conditions may fall within the following ranges Temperature _____ °C__ 15 to 500
Pressure _____ p.s.i.g__ Atmospheric to 1000
Space velocity _____ v./v./hr__ 0.1 to 10
Hydrogen/hydrocarbon mole ratio _____ 0 to 20:1

Within these general ranges the following types of process may be envisaged (a) Operation at low temperatures i.e. 15 to 200° C. preferably in the absence of hydrogen and preferably with no hydrogenating component on the catalyst. The principal reaction would be disproportionation.

(b) Operation at moderate temperatures i.e. 100–300° C. in the presence of hydrogen and with a hydrogenation component on the catalyst. The alkyl aromatic hydrocarbons would be disproportionated, and isomerised where possible, and also hydrogenated to give the corresponding naphthenes. For example toluene would give cyclo-hexane and $C_8$ naphthenes in their isomeric equilibrium proportions.

(c) Operation at higher temperatures i.e. 300–500° C. in the presence of hydrogen and preferably with a hydrogenating component in the catalyst. The principal reactions would again be disproportionation with isomerisation where possible but without hydrogenation and with dealkylation tending to increase with increase of temperature.

The other conditions for operation (c) may be

Pressure _____ p.s.i.g__ Atmospheric–1000
Space velocity _____ v./v./hr__ 1 to 5
Hydrogen/hydrocarbon mole ratio _____ 1 to 10:1

If desired an activator which is hydrogen chloride or a chlorinated hydrocarbon giving rise to hydrogen chloride under the reaction conditions may be added to the reaction zone in an amount from 0.01 to 5% wt., preferably 0.1 to 2% wt.

As indicated above the catalyst may contain a hydrogenating component, for example a metal or metal compound having hydrogenating activity selected from Groups VIa or VIII of the Periodic Table. The preferred metal is a platinum group metal which may be present in an amount from 0.01 to 5% wt. and preferably 0.1 to 2% wt. The preferred platinum group metals are platinum and palladium.

The inorganic oxide besides being halogenatable under the conditions specified above should also clearly have the desired physical characteristics to render it suitable as a hydrocarbon conversion catalyst. It is preferably a refractory oxide selected from Groups III to V of the Periodic Table, for example alumina, boria, silica, titania, or zirconia. Mixtures of two or more inorganic oxides may be used if desired. The preferred refractory oxide is alumina or a mixture containing a major proportion of alumina.

The feedstock may consist substantially wholly of alkyl aromatic hydrocarbons, or it may be a hydrocarbon mixture containing them. The preferred alkyl aromatic hydrocarbons are mono-alkyl aromatic hydrocarbons having from 1 to 4 carbon atoms in the alkyl groups for example toluene and methyl-naphthalenes which give on disproportionation toluene and xylenes and naphthalenes and dimethyl naphthalenes respectively. However, poly-alkyl aromatic hydrocarbons may also be converted, for example a mixture containing para-xylenes could be disproportionated to give penta- and hexa-alkylated benzenes.

The catalyst used is susceptible to hydroysis in the presence of water, which should, therefore, be excluded from the feedstock. It may also be desirable for the feedstock to have a low content of sulphur compounds and olefinic hydrocarbons.

As stated earlier the catalyst used and its method of preparation is described in Serial No. 135,426, filed September 1, 1961.

A particular feature of the catalyst preparation is the use of the specific compounds of the general formula indicated, these compounds giving a specific form of chlorination which produces active low temperature isomerisation catalysts. The following examples of compounds giving active and inactive catalysts respectively illustrate the specific nature of the compounds used.

Compounds giving active catalysts:

Carbon tetrachloride ($CCl_4$)
Chloroform ($CHCl_3$)
Methylene chloride ($CH_2Cl_2$)
Trichlorobromomethane ($CCl_3Br$)
Thiocarbonyltetrachloride ($CCl_3SCl$)

Compounds giving inactive catalysts:

Hydrogen chloride (HCl)
Chlorine ($Cl_2$)
Methyl chloride ($CH_3Cl$)
Acetyl chloride ($CH_3COCl$)
Dichloroethane ($CH_2Cl$—$CH_2Cl$)
Tetrachloroethane ($CHCl_2$—$CHCl_2$)
Tetrachloroethylene ($CCl_2$=$CCl_2$)

In the case of compounds containing elements other than chlorine, carbon and hydrogen, the treatment may add the other elements to the catalyst in addition to the chlorine. It has been found, however, that catalysts so prepared are still active, and they may have, in addition, other properties resulting from the addition of the other elements. It has also been found that small amounts of halogens (including chlorine) which may be present in the oxide prior to the chlorination treatment do not affect the activity of the catalysts. Thus, alumina when using may already contain up to 1% wt. of chlorine and/or fluorine, as when, for example, the material which is chlorinated by the process of the present invention is a catalyst normally used for the reforming of gasoline boiling range hydrocarbons. The preferred compounds giving active catalysts are carbon tetrachloride, chloroform and methylene chloride.

The compounds covered by the general formula in which X and Y together are O or S are phosgene and thiophosgene.

Any convenient form of oxide may be used which contains hydrogen. This is a characteristic of activated aluminas which, although predominantly alumina, do contain a small amount of hydrogen, usually less than 1% wt. This hydrogen is generally considered to be in the form of surface hydroxyl groups, and it is believed that the chlorine compound reacts with the surface hydroxyl groups to form the active catalyst sites. Water may be, in fact, a product of the reaction, but not all the hydrogen is removed and the treated catalyst still contains a measurable quantity of hydrogen. The amount of chlorine added to the catalyst is preferably within the range 1 to 15% wt., precise amount being dependent on the surface area as measured be low temperature nitrogen adsorption. It has been found that the maximum amount of chlorine which can be added to alumina without the formation of free aluminum chloride is related to the surface area and is about $3.0–3.5 \times 10^{-4}$ g./m.$^2$. Maximum chlorination is preferred, but lower amounts of chlorine still give active catalysts and a suitable range is, therefore, from $2.0 \times 10^{-4}$ to $3.5 \times 10^{-4}$ g./m.$^2$.

Any of the forms of alumina suitable as a base for reforming catalysts may be used, but a particularly preferred form is one derived from an alumina hydrate precursor in which the trihydrate predominates. One containing a major proportion of alumina trihydrate is particularly suitable. A convenient method of preparing the alumina is by hydrolysis of an aluminum alcoholate, for example, aluminum isopropoxide, in an inert hydrocarbon solvent, for example, benzene. Other things being equal, the greater the amount of chlorine taken up by the alumina, the greater is the activity of the catalyst and since, as stated above, the maximum amount of chlorine which can be added is related to the surface area, it is desirable that the alumina should have a high surface area, for example more than 250 m.$^2$/g. and preferably more than 300 m.$^2$/g.

The hydrogenating metal when present is desirably incorporated with the oxide prior to the treatment with the chlorine. When using a platinum group metal it is also desirable that it should be finely dispersed as small crystallites on the oxide, suitable criteria for the size of the crystallites being that they are not detectable by X-ray diffraction and that on treatment of the platinum group metal-alumina composite with benzene at 250° C. they have a measurable chemisorption, preferably not less than 0.1 molecules of benzene absorbed/atom of platinum and not less than 0.03 molecules of benzene absorbed/atom of palladium. Details of the benzene chemisorption technique have been published in "Actes du Deuxieme Congres International de Catalyse," Paris, 1960, vol. 2, page 1851.

A convenient method of obtaining the platinum group metal in the required state of sub-division is to add a solution of a platinum group metal compound to a hydrogel of the oxide and to precipitate the platinum group metal as a sulphide, for example by treatment with hydrogen sulphide. When a platinum group metal-alumina composite is treated with a chlorine compound according to the present method it is believed that a portion of the chlorine taken up is associated with the platinum group metal as an active complex.

The non-reducing conditions used for the chlorination may be either inert or oxidising conditions, the latter being preferred since they give catalysts which lose activity more slowly during low temperature isomerisation. A convenient method of contacting the alumina is to pass a gaseous stream of the chlorine compound over the alumina either alone or, preferably, in a non-reducing carrier gas. Examples of suitable carrier gases are nitrogen, air or oxygen.

Non-reducing conditions are essential, since reducing conditions tend to convert the chlorine compound to hydrogen chloride, which gives an inactive catalyst. The temperature for the chlorination may be from 300–1100° F. (149–593° C.). The tendency to form free inorganic chloride increases with temperature and care should therefore, be exercised when using the higher temperature within the stated range. When chlorinating alumina, the temperatures used will normally be above the volatilisation temperture of aluminium chloride, and the formation of free aluminium cholride is readily detected by its appearance in the gaseous reaction products. When treating a platinum group metal-oxide composite, care should also be exercisesd to prevent the formation of volatile platinum complexes, the tendency for the formation of such complexes again increasing with increasing temperature. When treating platinum group metal-alumina composites for example, the temperature is preferably 300–700° F. (149–371° C.), platinum-on-alumina composites being more particularly treated at 450–600° F. (232–316° C.) and palladium-alumina composites at 500–650° F. (260–343° C.). The chlorination reaction is exothermic and the temperatures specified are the initial temperatures used.

The rate of addition of the chlorine compound is preferably as low as practicable to ensure uniform chlorination and to avoid a rapid increase of temperature as a result of the exothermic reaction. Preferably the addition rate does not exceed 1.3% wt. of chlorine compound by weight of catalyst per minute. If a carrier gas is used the rate of flow is preferably at least 200 volumes/volume of catalyst/hour and a convenient range is 200–1000 v./v./hr. The pressure used is conveniently atmospheric.

The active catalyst is susceptible to hydrolysis in the presence of water and should, therefore, be stored under anhydrous conditions. Similarly the materials used in the catalyst preparation should also be free from water.

The invention is illustrated by the following examples:

Example 1

A catalyst having the following composition:

| | Percent wt. |
|---|---|
| Platinum | 0.54 |
| Chlorine | 12.8 |
| Hydrogen | 0.19 |
| Alumina | 86.5 | was prepared as follows:

150 ml. of a platinum-on-alumina catalyst, containing 0.58 wt. percent of platinum and 0.81 wt. percent of chlorine, was placed in a vertical reactor maintained at 300° C. and purged with dry nitrogen flowing at 200 ml./min. for one hour. With the nitrogen purge maintained, 30 ml. of dry carbon tetrachloride was then added dropwise to the catalyst zone over a period of ½ hour. Finally, the catalyst was purged again with nitrogen only for a further one hour, before being allowed to cool in the nitrogen.

A stream of toluene and hydrogen as a hydrogen:toluene mole ratio of 2.5:1 was passed over 50 ml. of the catalyst at 425° C., 0.2 v./v./hr. and atmospheric pressure. Analysis of the product obtained after 4 hours on stream showed the following composition:

| | Percent wt. |
|---|---|
| Benzene | 18.0 |
| Xylenes | 20.5 |
| Toluene | 61.5 |

Analysis of the xylene fraction showed that the isomers were present in near equilibrium amounts, viz an ortho:meta:para ratio of 1:2.5:1.

A comparative experiment using the platinum-alumina catalyst not treated with carbon tetrachloride showed that the catalyst was inactive for disproportionation giving less than 1% wt. benzene and less than 0.5% wt. xylenes.

Example 2

A stream of 1-methyl naphthalene and hydrogen was passed over 50 ml. of the catalyst of Example 1 at 350° C., 0.3 v./v./hr. and atmospheric pressures. The hydrogen flow rate was 5.0 litres/hour equivalent to a hydrogen:methyl naphthalene mole ratio of 2:1.

The product obtained after 4 hours on stream contained 6% wt. of naphthalene and 6% wt. of dimethyl naphthalenes. Analysis of the methyl naphthalene fraction showed that there was 60% wt. of 2-methyl naphthalene and 27% wt. of 1-methyl naphthalene, by weight of total product, indicating that extensive isomerisation of the 1-methyl naphthalene had occurred. Less than 0.5% wt. benzene homologues were produced, indicating that little destructive degradation had occurred.

A comparative experiment using the platinum-on-alumina catalyst not treated with carbon tetrachloride showed that it was inactive for disproportionation and isomerisation under similar process conditions.

Example 3

A liquid mixture of m-xylene (50.7% wt.) and ethylbenzene (49.3% wt.), and hydrogen were passed over 50 ml. of the catalyst of Example 1 at 350° C., 0.3 v./v./hr. and atmospheric pressure. The hydrogen flow rate was 5.0 litres/hour.

G.L.C. analyses of the products obtained at 1, 1½ and 2 hours on stream are given below.

| Hours on Stream | 1 | 1½ | 2 |
|---|---|---|---|
| Benzene _____ percent wt. | 8.3 | 5.9 | 5.8 |
| Toluene | 11.9 | 8.3 | 6.3 |
| Ethylbenzene | 26.5 | 31.4 | 35.5 |
| Total Xylenes | 34.6 | 40.3 | 41.6 |
|   Ortho | 6.0 | 6.8 | 7.9 |
|   Meta | 20.0 | 23.2 | 23.5 |
|   Para | 8.6 | 10.3 | 10.2 |
| C₉ and Higher aromatics | 18.7 | 14.1 | 10.8 |

The results show (a) Disproportionation of the $C_8$ alkyl aromatics to toluene and higher aromatics.

(b) Isomerisation of the m-xylene to give appreciable amounts of O- and p-xylene.

(c) Some production of benzene either by dealkylation or by further disproportionation of the toluene produced.

We claim:

1. A process for the disproportionation of alkyl aromatic hydrocarbons comprising contacting the alkyl aromatic hydrocarbons at a temperature in the range of 15° to 500° C., a pressure in the range of atmospheres to 1,000 p.s.i.g., a space velocity in the range of 0.1 to 10 v./v./hr., a hydrogen/hydrocarbon mole ratio in the range of 0 to 20:1; with a catalyst prepared by contacting a halogenatable inorganic oxide with a compound of general formulae:

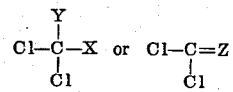

where X and Y may be the same or different and are selected from the group consisting of H, Cl, Br and SCl and where Z is selected from the group consisting of O and S under non-reducing conditions and at a temperature in the range of 149°–593° C. such that cholrine is taken up by the inorganic oxide without the formation of free inorganic chloride the catalyst containing from $2.0 \times 10^{-4}$ to $3.5 \times 10^{-4}$ of chlorine/sq. meter of the surface area.

2. A process as claimed in claim 1 wherein the conversion temperature is from 300 to 500° C.

3. A process as claimed in claim 1 wherein the catalyst contains a hydrogenating component selected from Groups VIa and VIII of the Periodic Table.

4. A process as claimed in claim 3 wherein the catalyst contains from 0.01 to 5% wt. of a platinum group metal.

5. A process as claimed in claim 4 wherein the catalyst contains from 0.1 to 2% wt. of platinum.

6. A process as claimed in claim 1 wherein the halogenatable inorganic oxide is alumina.

7. A process as claimed in claim 1 wherein the alkyl aromatics have 1-4 carbon atoms in the alkyl group.

8. A process as claimed in claim 6 wherein the chlorine containing compound reacted with alumina in the formation of the catalyst is carbon tetrachloride.

References Cited by the Examiner
UNITED STATES PATENTS

| | | | |
|---|---|---|---|
| 2,642,384 | 6/1953 | Cox | 208—139 |
| 2,781,324 | 2/1957 | Haensel | 260—668 |
| 2,880,168 | 3/1959 | Feller | 208—140 |
| 2,939,897 | 6/1960 | Beber et al. | 260—683.68 |
| 2,966,529 | 12/1960 | Haensel et al. | 260—672 |

DELBERT E. GANTZ, *Primary Examiner.*

ALPHONSO D. SULLIVAN, *Examiner.*